June 10, 1930.   A. G. RONNING   1,762,590
HYDRAULIC TRANSMISSION SYSTEM
Filed July 7, 1923   6 Sheets-Sheet 4

Patented June 10, 1930

1,762,590

UNITED STATES PATENT OFFICE

ANDREAN G. RONNING, OF MINNEAPOLIS, MINNESOTA; JACOB A. RONNING AND ADOLPH RONNING, EXECUTORS OF THE ESTATE OF SAID ANDREAN G. RONNING, DECEASED

HYDRAULIC TRANSMISSION SYSTEM

Application filed July 7, 1923. Serial No. 650,049.

Generally stated, my invention has for its object to provide an improved hydraulic transmission system adapted generally for the transmission of power but particularly adapted for use in connection with motor-propelled vehicles, and, broadly stated, the invention consists of the novel devices and combinations of devices hereinafter described and defined in the claims.

Various other objects of the invention may be stated as follows:

To eliminate crank shafts, connecting rods, timing gears, shafts, large bulky crank cases, making the engine more simple, having fewer working parts and about one-half the weight of engines corresponding in horse power; to eliminate an extra oil pump and still lubricate all bearings by circulating oil under pressure; to eliminate all exhaust valves and large intake valves in the explosion chamber; to eliminate waste of fuel by not using any fuel in the air that is used for scavaging purposes; to make the motors silent by letting the piston uncover the exhaust ports and intake ports and by burning the fuel oil under high pressure, yielding a longer, steadier application of power than by suddenly exploding the oil charge; to prevent preignition and obtain perfect combustion by igniting the fuel charge under high pressure and sufficiently compressed, agitated and atomized and mixed to enable one to successfully operate on all kinds and grades of hydro-carbon oils; to provide a simple electric ignition system to enable one to easily start a motor of this type in cold weather; to provide a motor construction that will eliminate piston slaps and the tendency to wear the cylinder walls unevenly; to provide a simple, inexpensive ignition system and lighting system without the use of storage batteries, enabling one to secure any desired intensity of light, irrespective of the speed of the engine; to provide a simple, inexpensive and powerful self-starter which is operated by compressed air from the storage tank already provided for the injection of fuel oil, thus eliminating the need of compression springs or storage batteries ordinarily used for this purpose; to provide a simple, inexpensive, highly efficient, air supply system for filling the tires with air without the weight, expense and inconvenience of an extra air pump; to provide means for automatically regulating the degree of compression; to provide means for automatically regulating the fuel supply in exact proportion to the load carried; to provide a simple, inexpensive and highly efficient air-cooling system; to provide a vehicle with means for securing any desired speed without the handicap and inconvenience of changing gears or shifting clutches; to provide a vehicle with any number of speeds without the need of changing the engine speed from its most economical and efficient speed; to provide a vehicle that will generate energy and transmit energy directly from the piston to the drive wheels through the medium of fluids and means for controlling and directing these fluids and making it possible to build an automobile or tractor without a single gear and reducing the number of high grade bearings; to provide a vehicle that will reverse its speed by merely turning a valve to change the direction of flow of said fluid; to provide means for controlling the flow of said fluid and thus eliminating the need of brake clutches on the supporting wheels of the vehicle; to provide a simple, efficient and effective means of transmitting power to any desired number of drive wheels and automatically regulating the relative amount of power transmitted to each wheel; to provide a vehicle with a differential that will enable one to apply any desired amount of power to any drive wheel without the need of applying brakes on the remaining wheels, thus avoiding any frictional loss in the control of the direction of power from said engine; to provide a vehicle with a power-generating and power-transmitting system that will reduce vibration to the minimum, avoid jars and reduce strains in applying the parts, thus eliminating the causes of excessive breakage of metals and wear of tires; to provide a vehicle with a power-generating and distributing system that will contain all of the working parts and controls in such a unifying and compact form that the operator thereof can adjust, repair, replace any of those working parts without the need of crawling underneath the machine; and finally, to construct the various units and combine them in such a way that the vehicle will be light, sturdy, even though the high compression principle is employed in the engine, thus making it possible to build a light, inexpensive, and highly efficient automobile that will operate successfully on any kind of low-grade oil.

In the accompanying drawings, which illustrate the invention, like characters indicate like parts throughout the several views.

Referring to the drawings:

Fig. 5 is a detail in section on the line 5—5 of Fig. 3;

Figure 1:
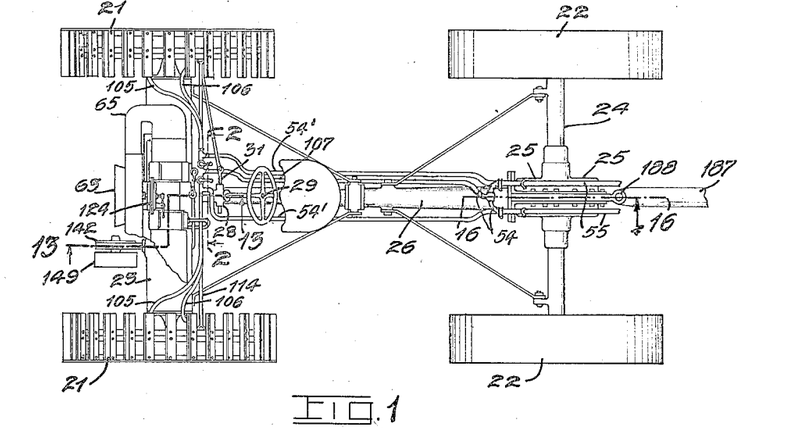
Fig. 1 is a plan view showing a tractor equipped with the improved hydraulic power-generating and transmitting mechanism and certain associated devices, in accordance with my invention.
Figure 2:
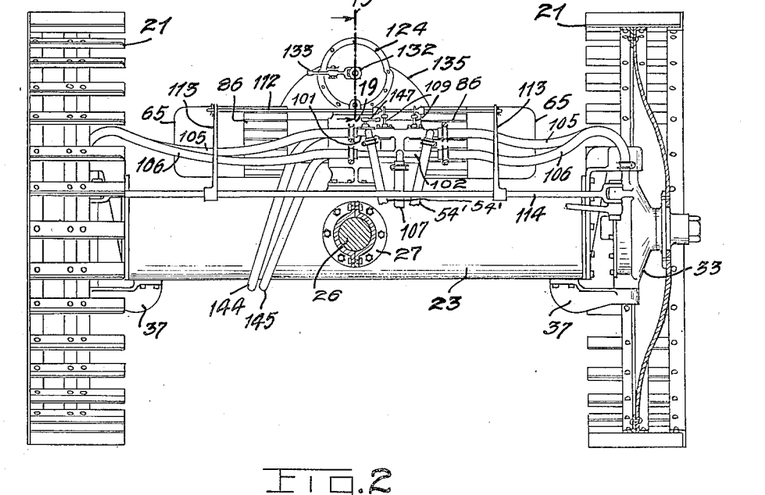
Fig. 2 is a transverse vertical section taken through the tractor on the line 2—2 of Fig. 1, looking forward.

Attention is first particularly directed to Figs. 1 and 2, which show the invention applied to a truck of the four-wheel drive type. Of the main parts of this truck, in so far as it is desirable for the purposes of this case to note the same, the numeral 21 indicates the front truck wheels, the numeral 22 the rear truck wheel, the numeral 23 the tubular front axle beam, the numeral 24 the rear axle casing, (including a centrally located motor casing 25), and the numeral 26 a reach beam, which connects the front and rear axle structures. The reach 26 has a flanged front end that is telescoped into a rearwardly projecting cylindrical portion 27 of the front axle beam 23, fits the same with a close joint and is swiveled thereon for oscillatory movements of said reach on its own axis, (see particularly Figs. 2 and 13). The flanged end of said reach, as shown, is detachably connected to the axle beam 23 by means of a split annular keeper or collar structure 28, the upper portion of which affords a bearing for the lower end of a steering post 29 equipped with a pinion 30 that meshes with a rack bar 31, (see Fig. 13).

Figure 14:
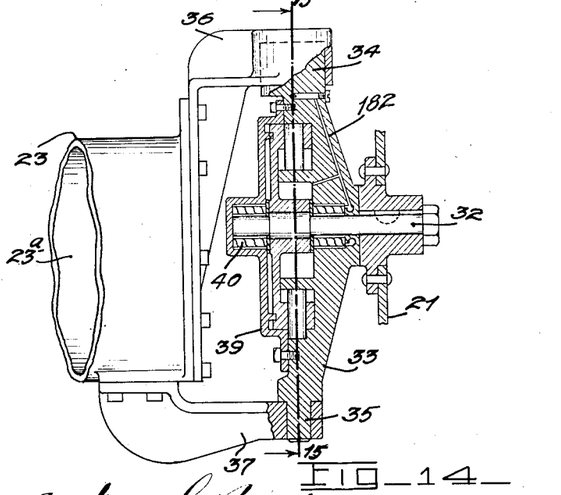
Fig. 14 is a view partly in rear elevation and partly in vertical section, showing the connection between the right-hand end of the front axle and the right-hand motor casing.
Figure 15:
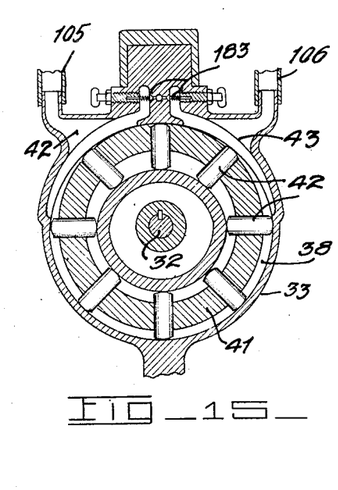
Fig. 15 is a vertical section on the line 15—15 of Fig. 14.

The front traction wheels 21, as shown are provided with tread surfaces formed by circumferentially spaced cleats and they are rigidly secured to the outer ends of stub shafts 32, (see particularly Figs. 14 and 15). These stub axles are journaled in cast motor casings 33 that perform the double function of wheel-supporting knuckles and motor casings and are provided with upper and lower trunnions 34 and 35 journaled, respectively, in upper and lower bearing brackets 36 and 37 secured to the ends of the front axle beam 23. The short wheel shafts or stub axles 32 are arranged to be independently driven by rotary fluid pressure motors, best shown in Figs. 14 and 15, and which motors, as shown, comprise as follows:

The oscillatory wheel casings 33, at their inner sides, are formed with annular or cylindrical piston seats 38, the open sides of which are normally closed by detachable cylinder heads 39 bolted or otherwise rigidly but detachably secured to said casings 33. The casings 33 and heads 39 are shown as provided with roller bearings 40 for the stub axle shafts 32, and rigidly secured to said shafts are rotary piston heads 41 of disc-like form having annular flanges equipped with radially movable propeller blades 42 that work in the co-operating annular piston seats 38 of the casings 33. By reference to Fig. 15, it will be noted that the annular piston seats 38 are in part eccentric to the axes of the co-operating stub shafts 32. However, the exact lines on which the said piston seats are made eccentric to said shafts may be varied, and the form of the so-called propeller blades 42 may also be varied, so far as this invention is concerned.

The casings 33 are provided with ports 42 and 43 that extend circumferentially in opposite directions to points approximately diametrically opposite in respect to the annular piston seat 38 into which they open.

The motive fluid for operating these front wheel driving motors will preferably be oil, and the oil under pressure will be supplied to and delivered from the motors through the ports 42 and 43, or conversely, from the hydraulic power-generating mechanism or pump already referred to and to be hereinafter more fully described.

The rear wheels 22 are connected to the outer ends of rear axle shafts 44, (see Figs. 16 and 17), that are journaled in the rear axle casing 24 and in the hubs of the casing 25. The casing 25, as shown, is made up of several sections rigidly connected by nut-equipped bolts 45. Said casing 25 is provided with twin annular piston seats or channels 46 that are in part eccentric to the axes of the axially aligned shafts 44, and to the adjacent ends of said shafts are rigidly secured rotary piston heads 47 provided with annular flanges equipped with radially movable propeller blades 48 that work in the respective channels 46. The channels 46 may be eccentric on any suitable lines. Also, the so-called propelling blades or elements 48 may be of any suitable form, so far as the present invention is concerned. The arrangement just described provides a duplex or twin rotary motor for independently driving the two rear axle shafts 44 and, hence, for independently driving the two rear traction wheels.

Figure 16:
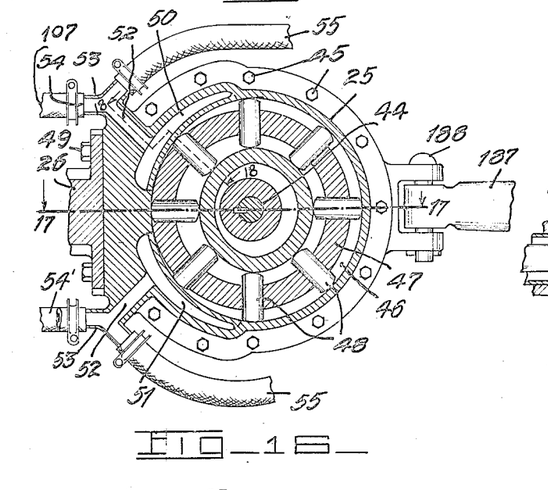
Fig. 16 is a vertical section on the line 16—16 of Figs. 1 and 17, showing the duplex rear axle motor.
Figure 17:
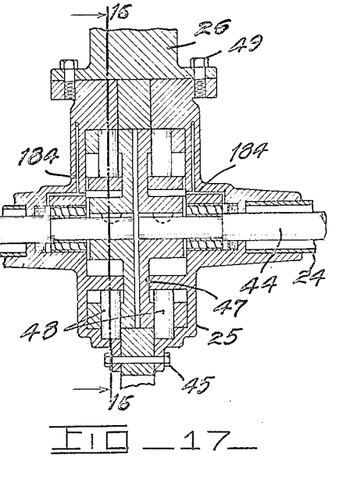
Fig. 17 is a horizontal section on the line 17—17 of Fig. 16.
Figure 18:
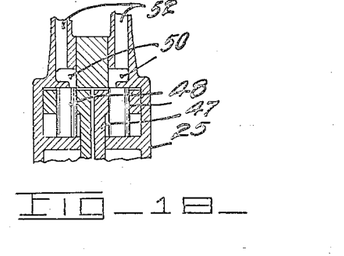
Fig. 18 is a fragmentary transverse section on the irregular line 18—18 of Fig. 16.

In the construction illustrated, the outside members of the casing 25 are provided at their front portions with flanges that adapt the casing to be rigidly secured to the flanged rear end of the reach 26 by machine screws or bolts 49, (see Figs. 16 and 17). Each annular piston seat 46 is provided with circumferentially extended upper and lower ports 50 and 51, respectively, which ports, (see Fig. 18), are laterally constructed to prevent the propeller blades 48 from being thrown out of the seat. Normally, the ports 51 will be intake ports and the ports 50 will be discharge ports; the relation can be reversed, as will be presently noted. The ports 50 and 51, respectively, are connected by conduits 52 to coupling nipples 53, which, in turn, are connected to fluid delivery conduits shown as in the form of flexible high-pressure hose 54 and 54'. The numeral 55 indicates fluid-conducting hose or tubes, which, as shown, are extended from the coupling nipples 53 and may be utilized to drive other motors, not shown. These tubes or hose 55, for the purpose of the present case, may be assumed to be closed by suitable valves, not shown.

Figures 2, 3:
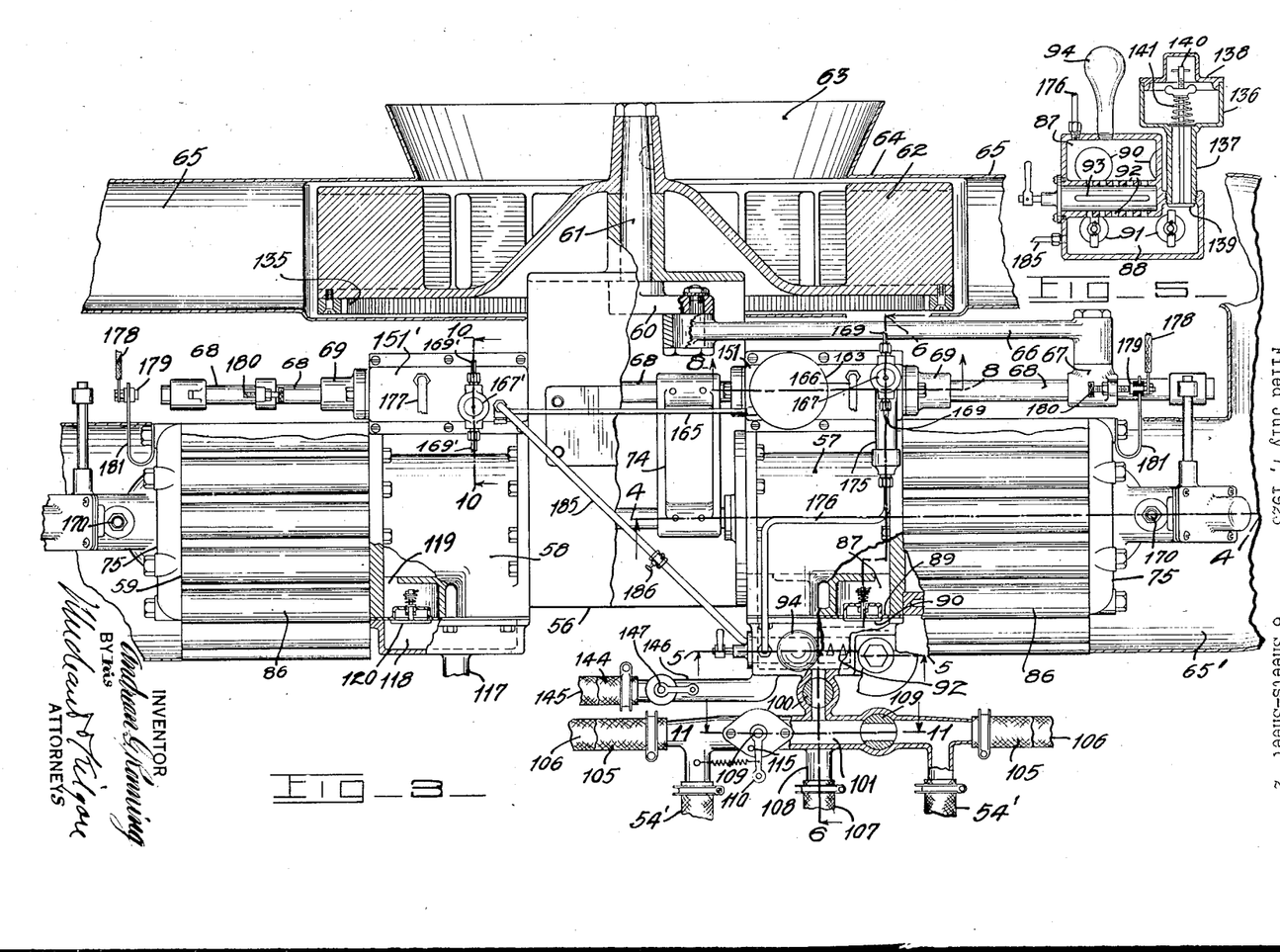
Fig. 3 is a view chiefly in plan but with some parts in horizontal section, showing the hydraulic power unit, to wit: the pump and pump-actuating means of the hydraulic generating and transmitting system.
Figure 4:
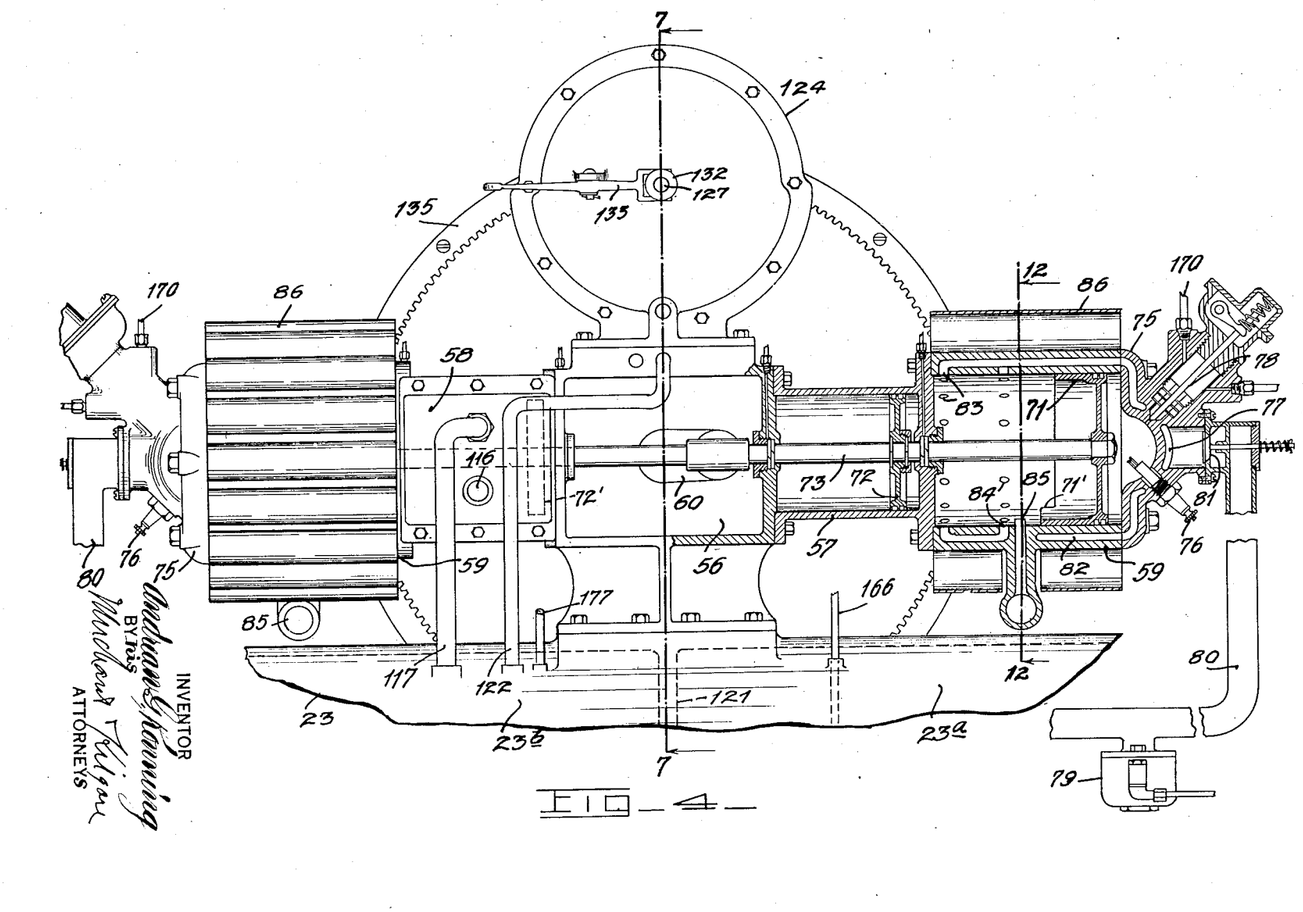
Fig. 4 is a view partly in rear elevation and partly in vertical section on the line 4—4 of Fig. 3.

Attention is now directed particularly to Figs. 3 and 4, which illustrate the so-called hydraulic power unit and which device, as shown, is mounted directly on the tubular front axle beam 23 and comprises, as its main fixed elements, a crank shaft chamber 56, an oil pump cylinder 57, an air pump cylinder 58, and working or power cylinders 59, all of which parts are rigidly connected in axial alignment.

Working in the crank chamber 56 is a crank 60, the shaft 61 of which is journaled in a suitable bearing on one side of the chamber 56 and at its other end is provided with a combined fly wheel and centrifugal fan or blower 62 arranged to take in air through a large axial opening 63 in a fan casing 64 that is rigidly secured in respect to the fixed elements of the power unit and is provided with oppositely extended air discharge tubes 65.

The crank 60 is connected by a rod 66 to a wrist pin 67 carried by a crosshead shaft 68 mounted to slide in suitable bearings 69 shown as secured at the outer ends of auxiliary pump cylinders which, in turn, are rigidly secured to the adjacent sides of the cylinders 57 and 58. The shaft 68 extends parallel to the aligned axes of the cylinders 57, 58 and 59.

Working in the cylinders 59 are pistons 71 and working in the cylinders 57 and 58 are pistons 72 and 72', respectively. All of these pistons are rigidly connected to a common piston rod or shaft 73, which, within the crank case 56, is rigidly connected by a crosshead 74 to the inner end of the crosshead shaft 68.

The cylinders 59, at their outer ends, have rigidly secured heads 75 shown as equipped with spark plugs 76, intake ports 77, and with high compression fuel injectors 78, which latter are of a well known type employed, for example, in internal combustion engines of the Diesel type. When the fuel injectors are used, pure air will be drawn in through the intake ports 77, but when the said fuel injectors are not used, said ports will be connected to a carburetor 79 through a suitable fuel intake pipe 80. The port 77, as shown, is provided with a suction-opened intake valve 81.

From the intake port 77, a plurality of branch intake conduits 82 extend through the cylinder heads 75 and the cylinders 59 and each conduit terminates in two delivery ports 83 and 84. The ports 83 and 84 are longitudinally spaced far enough so that the co-operating piston 71, in its innermost position, will be between said ports 83 and 84.

Just outward of the ports 84, the cylinders 59 are provided with discharge ports 85. By reference to Fig. 4, it will be noted that the bottoms of the flanges of the pistons 71 are extended at 71' so that the exhaust ports 85 will be closed when the pistons have moved inward but a short distance.

The engines made up of the cylinders 59 and pistons 71 operate on the two-cycle plan. Under the force of the explosion in the outer end of one of said cylinders, the co-operating piston will, of course, be moved inward or toward the crank shaft, and before it is moved far, the exhaust port 85 will be closed by the flange 71'. When the explosive vapor is obtained from the carbureter 79, it will be delivered through the ports 77, conduits 82 and delivery ports 83 and 84. Under outward movements of the pistons, partial vacuum will be produced, which will draw the explosive vapor into the inner ends of the pistons. Under working or inward movements of the pistons 71, the explosive charge will be compressed, (the valve 81 will then automatically close), until the piston 71 has passed inward beyond the delivery ports 84 and then the compressed vapor will be transferred from the ports 83 to the ports 84 and delivered into the outer ends of the cylinders, so that under the next outward movement of the piston, the explosive charge will be compressed in the outer or combustion ends of the cylinders simultaneously with the drawing into the inner ends of the piston the new charge of explosive vapor.

When the vapor fuel is delivered into the outer ends of the cylinders through the fuel injectors 78 and the carbureter is not used, pure air will be drawn in through the ports 83 and 84 in the same manner as in the above described intake of the explosive vapor from the carburetor.

Figures 7, 8, 10, 11, 12:
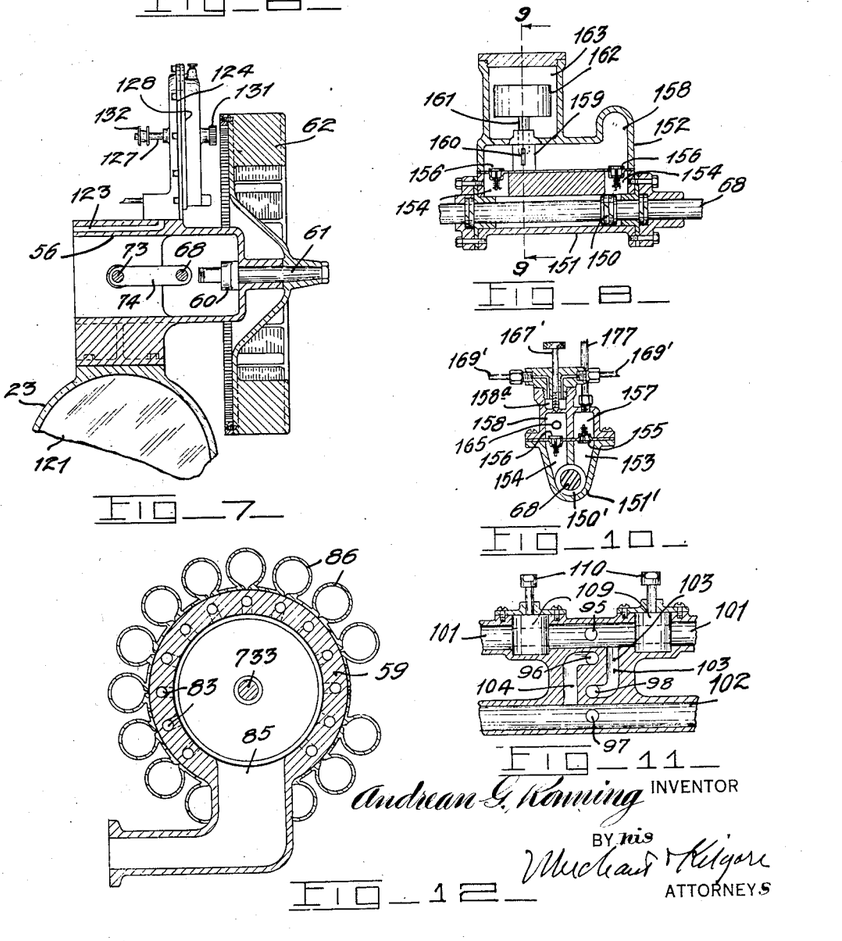
Fig. 7 is a vertical section on the line 7—7 of Fig. 4.
Fig. 8 is a vertical section on the line 8—8 of Fig. 3.
Fig. 10 is a detail in section on the line 10—10 of Fig. 3.
Fig. 11 is a vertical section on the line 11—11 of Fig. 3.
Fig. 12 is a vertical section on the line 12—12 of Fig. 4.

For cooling the engine cylinders by air, the cylinders 59 are surrounded by a copper jacket made up of a multiplicity of flanged copper tubes 86, best shown in Figs. 3, 4 and 12. For directing the air from the blower 62, the air discharge pipes 65, (see particularly Fig. 3), are extended and provided with expanded ends 65' that enclose and communicate with the outer ends of the air tubes 86. I have now described means for reciprocating the oil pump piston 72 and the air pump piston 72'.

At each end of the pump cylinder 57, (see Figs. 3 and 6), are upper and lower ports 87 and 88, through which are extended diaphragms 89. The diaphragms 89, in the ports 87, are equipped with outwardly opening check valves 90 and, in the ports 88, are equipped with inwardly opening check valves 91. The ports 87 and 88 are vertically separated by a horizontal web, which has by-pass ports 92 adapted to be closed or opened more or less by a rotary controller valve 93, (see Figs. 3 and 6).

Figure 6:
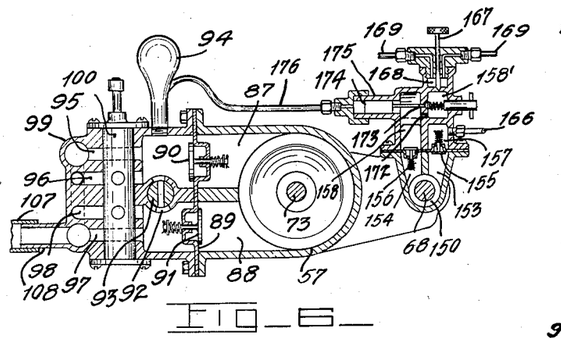
Fig. 6 is a vertical section on the line 6—6 of Fig. 3.

The diametrical passage through the controller valve 93 is a long slot, but the ports 92 are arranged in a series and are triangular, so that a graduated progression may be produced in the by-pass flow by movements of the valve while its diametrical passage is in communication with said triangular ports.

The numeral 94 indicates pressure-equalizing bulbs connected to the ports 87. Attention is further called to the fact that the ports 87, at the opposite ends of the cylinders 59, outward of the diaphragm 89, are connected to form a single port and that the same is true in respect to the ports 88. By particular reference to Fig. 6, it will be noted that the connected outer portions of the ports 87 lead to ports 95 and 96 and that the connected outer extremities of the ports 88 connect to the ports 97 and 98, all of which ports are formed in a case valve seat 99. The four ports 95, 96, 97 and 98 are controlled by an oscillatory reversing valve 100 which, in the position shown in Fig. 6, opens the ports 95 and 97 and closes the ports 96 and 98, but when rotated 90°, will open the ports 96 and 98 and close the ports 95 and 97.

By reference to Figs. 3, 6 and 11, it will be noted that the port 95 has oppositely extended tubes 101 and that the port 97 has oppositely extended tubes 102. Also, it will be noted that the port 95 is connected to the port 98 through a conduit 103 and that the port 96 is connected to the port 97 through a conduit 104. The ends of the tube 101 are connected by flexible tubes or hose 105, which lead to the ports 42 of the front wheel motors, and that the ports 43 of said front wheel motors are connected by flexible pipe tubes or hose 106 to the opposite ends of the tube 102. With the connections just described and with the reversing valve set as shown in the drawings, the rotors of the front wheel motors will be driven in an anti-clockwise direction in respect to Fig. 15 and the tractor will be propelled forward; but when the reverse valve 100 is rotated 90°, the rotors of said front wheel motors will be rotated in an opposite direction.

By reference to Figs. 1, 2, 3 and 16, it will be noted that the upper tubes 54, which are normally the return tubes from the twin rear motor, are connected to a common return pipe 107 which leads back to a nipple 108 which is on the tube 102 and, hence, is in constant communication with the ports 96 and 97.

The lower tubes or hose 54' lead back to the opposite ends of the tube 101. With this arrangement, when the reverse valve 100 is set as shown in the drawings, oil from the pump will be delivered to the rear twin motors through the two tubes 54' and while the return of oil from these twin motors back to the pump will be through the common return tube or pipe 107, and the rotors of said twin motor will then be rotated in an anti-clockwise direction in respect to Fig. 16, thereby propelling the tractor forward. When, however, the reverse valve 100 is oscillated 90° from the position shown in Fig. 6, the flow of oil will be reversed through said connections and the rotors of said twin motor will be rotated in a clockwise direction in respect to Fig. 16, thereby propelling the tractor backward.

As an important feature, I provide steering gear controlled means whereby the motors on the outer side, in traveling a curve, will be driven proportionately faster than the wheels on the inside. This control means, (see particularly Fig. 13), comprises two normally open valves 109 located in the tube 101 on opposite sides of the reverse valve 100. These two valves, as shown, have rearwardly projecting arms 110 that are subject to tappets or projections 111 rigidly but adjustably secured on a cross rod 112, which, as shown, is supported by upstanding arms 113 carried by the tie-rod 114, which latter connects the knuckle-acting motor casings 33 for parallel oscillatory movements on their trunnions 34 and 35. Normally, the arms 110 are spring-pressed against stops 115, (see Fig. 3), and are then held in their extreme open positions. With this arrangement, under the ordinary manipulation of the steering gear of the tractor, the supply of the oil or power-transmitting fluid to the front and rear motors on the inside of the curve will be cut down substantially proportionate to the abruptness of the curve while the supply of the motive fluid to the motors on the outside of the tractor or automobile will be increased, even though the valve 109, controlling the supply to the outer side, is not moved and because of the fact that the valve 109 controlling the supply to the inner side is partly closed. It is obvious that, by varying the position of the stops 115, the machine can, at will, be made to pull more on one side than the other and thus become an efficient means of overcoming side draft in operating various farm tools.

For supplying the electric circuit required for producing the spark, for light purposes, etc., I provide a small generator that is arranged to be driven by a rotary air or fluid-actuated motor, which latter is supplied with air under pressure from the air pump 58—72. Here it should be noted that the air pump cylinder 58 is provided with an air intake port 116 and with an air discharge pipe 117. The pipe 117 extends from an air chest 118, (see Figs 3 and 4), which air chest is connected to ports 119 in the opposite ends of the cylinder 58, through suitable valves 120, such as usually provided in double-acting cylinder and piston air pumps.

It has already been noted that the front axle beam 23 is a hollow or tubular structure. As a quite important feature, I utilize this front axle beam for the storage of fluid and, preferably, it is divided into two chambers or compartments 23$^a$ and 23$^b$ by a central partition 121. The chamber 23$^a$ may be utilized for the storage of the fluid fuel and the chamber 23$^b$ for the storage of air under compression. Hence, the exhaust pipe 117 from the air pump is connected to said chamber 23$^b$ and the said chamber, by an air delivery pipe 122, is connected to an intake conduit 123 of said rotary motor, (see Figs. 4, 19 and 20). The said conduit 123 is formed in part in the top of the crankcase casting 56 and in part in a supplemental bracket-like casting 124 secured on the latter. This casting 124 is formed with an annular blade channel in which work the propeller blades 125 of the rotor 126 of said motor. Said rotor 126 is keyed to rotate with a shaft 127 that is mounted in the casting 124 and in the fixed cover plate 128, with freedom for slight endwise movements. The rotor 126 of the motor carries the armature magnets 129 and the cover plate 128 supports the field magnets 130 of the electrical generator. The shaft 127, at one end, carries a pinion 131 and, at its other end, a grooved shipper head 132, which latter is engaged by a shipper lever 133, (see Figs. 4 and 19). The air supply conduit 123, which leads to the intake port of the rotary air motor is arranged to be opened and closed, more or less, to vary the speed and power of the motor, by a suitable valve mechanism 134, not necessary for the purposes of this case to describe in detail.

Figure 19:
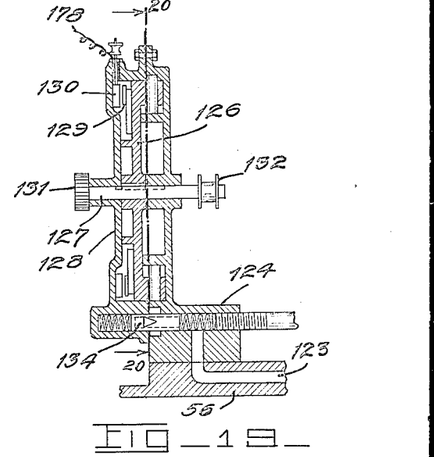
Fig. 19 is a section on the line 19—19 of Fig. 2.
Figure 20:
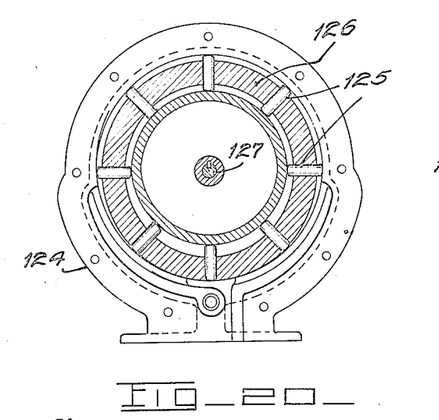
Fig. 20 is a transverse vertical section on the line 20—20 of Fig. 19.

The rotary air motor just described is adapted to be utilized as a starting motor and, hence, the fly wheel 62 is provided with an internal annular gear 135, (see Figs. 3, 4 and 7), with which the pinion 131 of the motor shaft 127 may be engaged when said shaft is slid toward the left from the position shown in Fig. 19.

In Fig. 5, I have shown a device whereby the oil circulating system may be conveniently kept filled with oil. This device, as shown, comprises a sort of a funnel structure made up of an oil reservoir 136 and a depending tube 137, which latter opens into the chamber 88 already described. The reservoir 136 has a removable cover 138. The lower end of the tube 137 is normally closed by an inwardly or downwardly opening check valve 139, the stem 140 of which is subject to a compression spring 141 that reacts against the bottom of the chamber 136.

Figure 13:
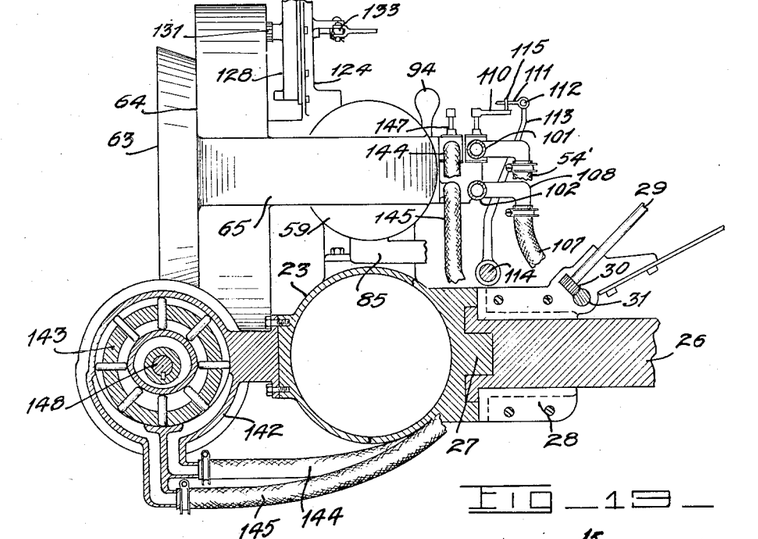
Fig. 13 is a fragmentary vertical section on the irregular line 13—13 of Fig. 1.

To afford power for driving various different kinds of stationary farm machinery or the like, I provide an auxiliary rotary fluid-actuated motor, best shown in Figs. 1 and 13. This motor is preferably of the same type as the various rotary motors above described in detail and, for the purposes of this case, it is only necessary to particularly note the motor casing 142 and its blade-equipped rotor 143. The motor casing 142 is shown as rigidly secured to and projecting forward from the front axle structure 23 and it receives the oil or propelling fluid through a flexible pipe or hose 144 and returns the same through a flexible pipe or hose 145. The hose 144 leads from the outer extremity of the oil outlet chamber 87 of the oil pump and the hose 145 leads back to the outer extremity of the chamber 88 of said pump. The hose 144, as shown, is directly connected to a long nipple 146 that is equipped with a controlling valve 147, (see Fig. 3). The nipple 146 is directly connected to the outer extremity of said chamber 87.

The pump rotor 143 is provided with a shaft 148 that is equipped at its outer end with a driving pulley 149, (see Figs. 1 and 13). This pulley 149 is adapted to drive a belt for the transmission of power to operate various different kinds of stationary farm machines, such as sawmills, separators, grinding machines, and the like.

Figure 9:
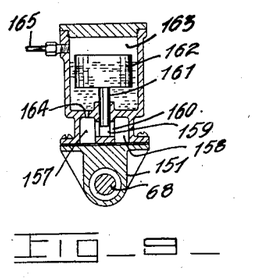
Fig. 9 is a transverse section on the line 9—9 of Fig. 8.

In Figs. 6, 8, and 9, I have illustrated a pump with connections for positively forcing the fluid fuel from the fuel tank 23ª, Fig. 4, to the fuel injector shown in detail at the right in said view. The crosshead shaft 68 already described is utilized as the piston rod of this pump and it is provided with a small piston head 150 that works in a cylinder 151 of a housing 152 that is rigidly secured on or in respect to the cylinder 57 of the oil pump, (see Fig. 3). The cylinder 151 is provided at its opposite ends with intake ports 153 and outlet ports 154. The ports 153 and 154 are provided with outwardly and inwardly opening check valves 155 and 156. The ports 153 and 154, through the said valves, are connected, respectively, with fuel supply chambers 157 and with fuel discharge chambers 158. The said supply and discharge chambers 157 and 158 are separated by a web in which is a vertical plunger valve seat 159, which has a port 160 affording a by-passage between the said two chambers when opened. The port 160 is adapted to be opened and closed by a vertically movable plunger-acting valve 161, (see Figs. 8 and 9), seated in 159 and provided at its upper end with a float 162 contained within a closed chamber 163 secured on the housing 152. The bottom of the chamber 163 is connected by a passage 164 that leads to the fuel intake chamber 157, (see Fig. 9). The top of the float chamber 163 is connected by an air pipe 165 to the chamber 158 of an air pump, (Fig. 10). A fuel supply pipe 166, (see Fig. 4), extends from the lower portion of the fuel tank 23ª and delivers to the supply chamber 157, (see Fig. 6).

In the top of the secondary fuel delivery chamber 158' is a needle valve 167 that controls a port that delivers into a third chamber 168 from which lead fuel discharge ducts 169. These ducts 169, by fuel delivery pipe 170, are connected, respectively, to the fuel-injecting devices 78 that are located one at the outer end of each working or power cylinder.

It may now be understood that, under the action of the pump 150—151, the gasoline or fluid fuel from the fuel tank 23ª will be positively forced to the fuel injectors. The pressure of the compressed air maintained under the action of the air pump 150'—151' will be active in the upper end of the float chamber 163 and will exert a downward pressure on the fluid fuel contained in said chamber 163, which tends to keep the altitude of the latter down and the valve 161 in position to close the by-pass port 160. When, however, the pressure exerted by the pump 57—72, in the act of forcing the power-transmitting oil or fluid to the several motors, exceeds a certain predetermined pressure, more of the fluid fuel will be forced into the chamber 163 and the float 162 will raise the valve 161, thereby more or less opening the by-pass port 160, and this, as is evident, will immediately reduce the pressure applied to the transmitting oil by shortcircuiting at least a part thereof from the chamber 160 to the chamber 158. It will, of course, be understood that the fluid fuel, passing through the port 160, will not be forced to the injectors 78 but will make a short course back to the intake of the oil pump.

Further considering the action of the fuel pump 150—151 and associated connections, it will be noted that the secondary fuel chamber 158' is connected to the fuel discharge chamber 158, (Fig. 6), through a small normally open port 172 and through another port that is normally closed by a spring-pressed valve 173. The stem of the valve 173 is connected to a small piston 174 that works in a small cylindrical extension 175 of the chamber 158' and the outer end of which is connected by a small tube 176 to the outer portion of the discharge port 87 of the pump 57—72. With this arrangement, there will be a slightly greater pressure on the outer end of the piston 174 than there is on the inner end thereof and, hence, when the pressure in the discharge port or chamber 87 of the pump 57—72 exceeds a certain predetermined pressure, then the piston 175 will move the valve 173 into an open position, thereby giving an increased supply of the gasoline or fluid fuel to the auxiliary chamber 158' and from thence through the tubes 169 to the two fuel injectors 78. When the fuel injectors 78 are used, air under very high pressure, say, for example, five hundred pounds pressure, should be delivered to said injectors, and to produce this high pressure supply of air, I provide a small secondary air pump, the construction of which is like that illustrated in Figs. 3, 6, 8 and 9, except for the following connections. The intake chamber 157 is connected by an air supply pipe 177 to the compressed air tank or reservoir 23$^b$. The pump discharge chamber 158, in its top, is connected to a secondary chamber 158$^a$ through a small port that is adapted to be opened more or less by a needle valve 167'. This secondary chamber 158$^a$ is connected by small air pipes 169' to the air-receiving chambers of the fuel injectors 78. With this arrangement, as is evident, the air compressed in the air tank 23$^b$, say to a pressure of two hundred pounds, will, by this secondary air pump, be compressed to the relatively much higher pressure and delivered to the fuel injectors. The cylinder of this secondary air pump is indicated by the numeral 151' and, like the cylinder 151, is rigidly secured to the adjacent pump structure, and its small piston head 150' is connected to and carried by the crosshead shaft 68.

The ignition circuits 178 from the generator 129—130 to the spark plugs (not shown) for the two engine cylinders 59 are arranged to be opened and closed with properly timed actions by switch elements comprising contacts 179 and 180. The contacts 179 are connected to one of the circuit leads 178 and are supported by but insulated from spring arms 181 secured to the engine cylinders, best shown in Fig. 3. The contacts 180 are in the form of screws that are adjustably secured to and carried by lugs, which, in turn, are carried by the crosshead shaft 68.

In Figs. 14, 15 and 17, I have shown means for connecting certain of the bearings to oil return ducts that lead back to the suction or return side of the oil-circulating conduit of the transmission system. Attention is first called to Figs. 14 and 15, wherein the numeral 182 indicates oil conduits leading from the journals of the front wheel motors and are connected to the ports 42 and 43 of said motors, through reversely acting spring-pressed check valves 183. These check valves close against pressure, but automatically open on the one side or the other, according to whether the motor is being rotated in the one direction or the other. In Fig. 17, oil return ducts 184 lead from the bearings of the twin motor back to the delivery side of the oil-circulating system.

In Fig. 3, the numeral 185 indicates an air pipe equipped with a normally closed valve 186 and which valve, when open, permits air under high compression to be delivered from the high pressure air pump into the outer extremities of the ports 88 of the oil-circulating system. With this connection, the main oil-circulating conduits for the transmission of the motive fluid may be drained of oil or liquid; then, when the valve 186 is opened up, air under high compression may be used as the power-transmitting medium of the power transmission system.

In Figs. 1 and 16, the numeral 187 indicates a drawbar yoke pivotally connected at 188 to the rear of the twin motor casing and which may serve as the drawbar of a truck connected at the rear of the tractor illustrated and which truck may have a motor supplied with motive fluid circulated through the extension pipes 55.

Directing attention again particularly to Fig. 3, it will be noted that the connecting rod 66 is pivotally attached to the crank 60 by a rotatively adjustable eccentric crank pin. By adjustments of the crank pin, the throw of the crank 60 may be varied so as to simultaneously vary the stroke and, hence, the compression produced in the two cylinders 59 by the pistons 71.

Several functions of the compressed air tank 23$^b$ have already been noted, but it will be understood that this tank may be utilized for various other purposes, such as for supplying air to charge pneumatic tires, for operating signal horns, etc.

What I claim is:

1. In combination, longitudinally spaced internal combustion power units, a liquid circulating pump and an air compressor, said power units, pump and compressor having axially aligned cylinders and pistons and a common connecting rod, a power-transmitting rod movable paralled to said connecting rod, and a member connecting said two rods at a point between said pump and compressor.

2. In combination, longitudinally spaced internal combustion power units, a liquid circulating pump and an air compressor, said power units, pump and compressor having axially aligned cylinders and pistons and a common connecting rod, fuel injectors applied to the cylinders of said power units, and a fuel supply pump delivering to said injectors and provided with a piston arranged to move in synchronism with said piston rod.

3. The combination with an internal combustion engine comprising a cylinder and piston, of a fuel injector delivering to said cylinder, a fuel pump comprising a cylinder and piston, said two mentioned pistons being in alignment and connected by a common connecting rod for synchronous movements and the cylinder of said fuel pump being connected to a source of fuel supply and to said fuel injector, and power transmitting means including a liquid-circulating pump also having a piston connected for synchronous movement with the engine piston.

4. In combination, longitudinally spaced internal combustion power units, the cylinders of which have outstanding heat-radiating surfaces with longitudinal air passages therethrough, a blower driven by the power units and having air tubes arranged to deliver air to said air passages, and a pump located between said power units and driven thereby, said pump also being subject to the cooling action of the air blast from the blower.

5. In combination, longitudinally spaced internal combustion power units having air passages thereabout, a blower driven by the power units and adapted to deliver air to said passsages, and a hydraulic pump and air pump both located between and in axial alignment with said power units and driven thereby, said air pump and hydraulic pump also being subject to the air blast from the blower.

6. In combination, axially spaced internal combustion power units of the cylinder and piston type, a hydraulic pump and an air pump axially aligned with said internal combustion power units, a common piston rod to which the pistons of said pumps and power units are directly connected for synchronous movements, a crosshead rod parallel to and connected with said common piston rod, fuel injectors applied to the cylinders of said power units, a fuel pump and a high compression air pump both of the cylinder and piston type having their pistons secured to and driven by said crosshead rod, and fuel and air delivery conduits respectively connecting said two latter noted pumps to said fuel injectors.

7. In combination, axially spaced internal combustion power units of the cylinder and piston type, a hydraulic pump and an air pump axially aligned with said internal combustion power units, a common piston rod to which the pistons of said pumps and power units are directly connected for synchronous movements, a crosshead rod parallel to and connected with said common piston rod, fuel injectors applied to the cylinders of said power units, a fuel pump and a high compression air pump both of the cylinder and piston type having their pistons secured to and driven by said crosshead rod, and fuel and air delivery conduits respectively connecting said two latter noted pumps to said fuel injectors; a fuel tank from which said fuel pump receives its supply, and a connection whereby said high compression air pump receives air from the first noted air pump.

8. In combination, axially spaced internal combustion power units of the cylinder and piston type, a hydraulic pump and an air pump axially aligned with said internal combustion power units, a common piston rod to which the pistons of said pumps and power units are directly connected for synchronous movements, a crosshead rod parallel to and connected with said common piston rod, fuel injectors applied to the cylinders of said power units, a fuel pump and a high compression air pump both of the cylinder and piston type having their pistons secured to and driven by said crosshead rod, and fuel and air delivery conduits respectively connecting said two latter noted pumps to said fuel injectors; a fuel tank from which said fuel pump receives its supply, and a connection whereby said high compression air pump receives air from the first noted air pump; and an air storage chamber in the connection between said two air pumps.

In testimony whereof I affix my signature.

ANDREAN G. RONNING.